Figure 1:
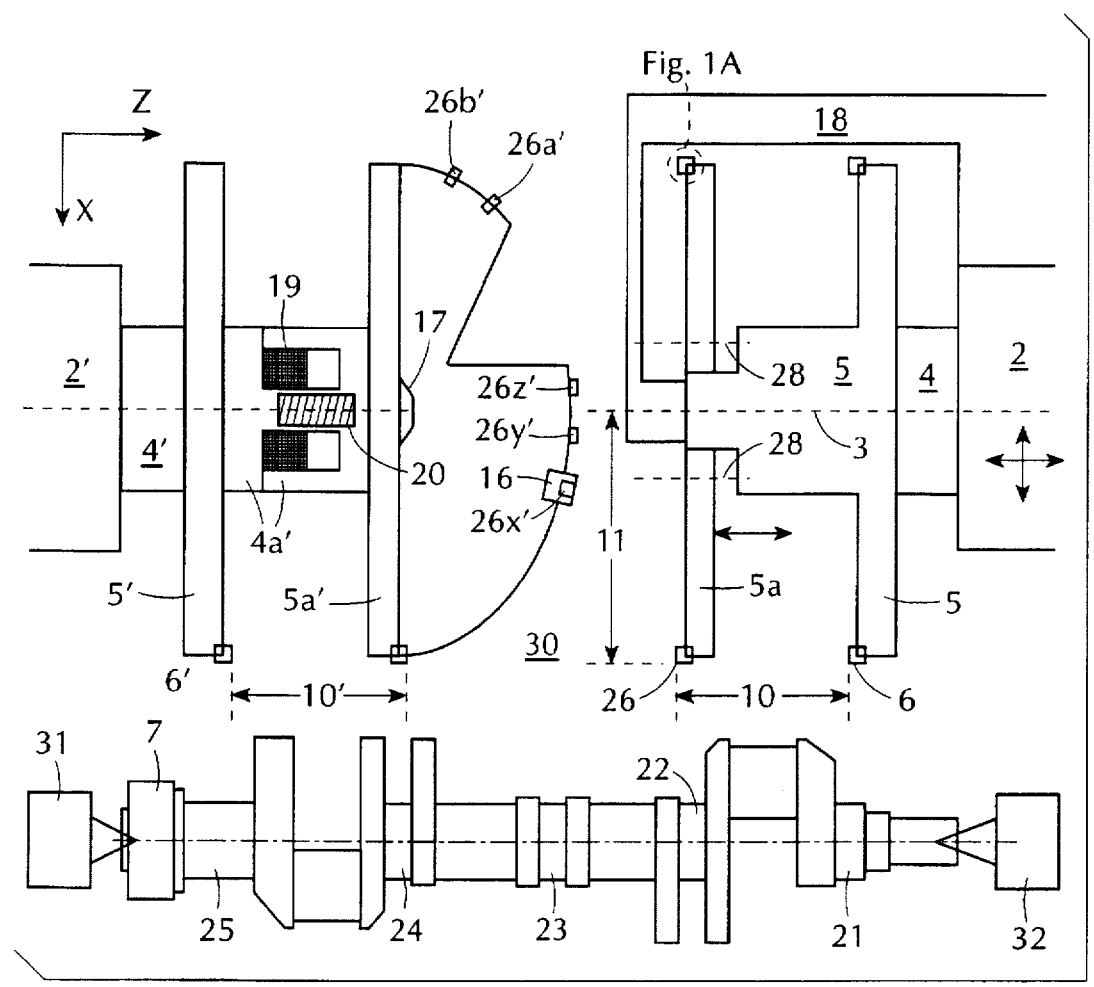

United States Patent [19]
Kiefer et al.

[11] Patent Number: 5,743,688
[45] Date of Patent: Apr. 28, 1998

[54] MACHINE FOR TURN BROACHING CRANKSHAFTS WITH ROTATIONALLY SYMMETRICAL SURFACES

[75] Inventors: Herbert Kiefer, Steisslingen; Herbert Klemisch, Uhingen; Kurt Rohr, Goppingen-Bezgenriet; Rolf Santorius, Uhingen-Nassachmühle; Manfred Schuler, Goppingen-Faumdau; Wolf-Dietrich Voss, Boll, all of Germany

[73] Assignee: Boehringer Werkzeugmaschinen GmbH, Goppingen, Germany

[21] Appl. No.: 395,389

[22] Filed: Feb. 27, 1995

[30] Foreign Application Priority Data

Feb. 27, 1995 [DE] Germany .................. 44 06 272.9

[51] Int. Cl.$^6$ ................................ B23D 43/06
[52] U.S. Cl. ............... 409/268; 82/106; 409/287
[58] Field of Search ............ 82/1.11, 106, 131; 409/244, 245, 268, 282, 280, 287, 262, 348, 199

[56] References Cited

U.S. PATENT DOCUMENTS

| | | | |
|---|---|---|---|
| 4,116,111 | 9/1978 | Schmid | 82/106 |
| 4,242,020 | 12/1980 | Schmid | 82/106 |
| 4,799,839 | 1/1989 | Berstein et al. | 409/268 |
| 4,995,160 | 2/1991 | Schmid | 409/268 |
| 5,120,166 | 6/1992 | Woerner | |
| 5,373,631 | 12/1994 | Schmid | |

FOREIGN PATENT DOCUMENTS

| | | | |
|---|---|---|---|
| 0 264 473 A1 | 4/1988 | European Pat. Off. | |
| 8713727 U | 1/1988 | Germany | |
| 3 835 830 C1 | 11/1989 | Germany | |
| 4131363 | 4/1993 | Germany | 409/268 |
| 145207 | 6/1990 | Japan | 409/287 |
| 243216 | 9/1990 | Japan | 409/287 |
| 77106 | 3/1993 | Japan | 409/268 |

Primary Examiner—Daniel W. Howell
Attorney, Agent, or Firm—Morgan & Finnegan, L.L.P.

[57] ABSTRACT

A machine and a process of using the machine for turn-broaching a workpiece to for crankshafts or camshafts. The machine comprises turn-broaching units having peripheral cutters whose cutting surfaces are monitored and automatically adjusted to compensate for wearing. The angular positions of the cutters of a turn-broaching unit may also be offset with respect to one another such that only one cutter is in contact with the surface of the workpiece at each instant.

12 Claims, 3 Drawing Sheets

MACHINE FOR TURN BROACHING CRANKSHAFTS WITH ROTATIONALLY SYMMETRICAL SURFACES

DESCRIPTION

Components, such as crankshafts and camshafts, having rotationally symmetrical metal surfaces offset radially and axially relative to one another are machined by means of turn broaching, turning/turn broaching or turning or by a mixture of these individual steps.

Turn broaching is a process of slowly guiding a broaching tool, shaped with a circular or partially circular contour, along a rapidly rotating workpiece surface which is to be machined. If the usually disc-shaped or annular turn-broaching tool unit is stopped intermittently and only one of the cutters arranged in its peripheral area is moved towards the rotating workpiece as in turning, the method is known as turning/turn broaching.

A machine used for this purpose is similar to a lathe in construction, and has at least one tool rest, but generally two tool rests, each traversable in the axial X-direction and perpendicular thereto in the Z-direction.

Here, a distinction can be made between two different known machine variants and their associated machining methods.

In one, each tool rest carries a turn-broaching tool unit which is generally disc-shaped. By advancing this tool unit to the workpiece in the X- and Z-direction as well as pivoting the turn-broaching tool unit about an axis, the various cutters of the turn-broaching tool unit are brought into engagement one after another to roughen and finish the surfaces as desired in the production of bearing surfaces, webs, oil collars, etc.

Depending on the stability of the individual machine or the presence of additional supporting means, only the tool unit of a single rest or the tool units of two rests can engage the workpiece at the same time. This results in a relatively long machining time even for a passenger-car crankshaft with generally at least four main bearing points. Moreover, when the surfaces of the individual cutters are worn, they have to be discarded, even though they have not yet reached the end of their useful life. It would be advantageous to be able to compensate for such tool wear by moving or traversing the rest carrying the tool unit in the X- or Z-direction by means of a machine control unit to prolong the useful life of the corresponding cutters or of the entire turn-broaching tool unit until the end of their useful life is reached.

In another variant, work is carried out with the so-called gang tools, where a combination of turn-broaching tool units are used by firmly coupling them to one another axially and radially on an axially continuous, central support element. The number of turn-broaching tool units in the combination is in accordance with the total number, for example, of crankshaft main bearings or crankpin bearings to be machined. In such a machine, the gang tool is accommodated and pivoted at its two end faces by one of two tool rests or by enclosing it in a single rest.

For traversing the gang tool in the X-direction or the Z-direction as needed and for pivoting the gang tool, the movements of the two participating rests have to be synchronized. With a gang tool, machining can be carried out much more quickly. However, compensation for wear of the cutters of a gang tool can only be carried out in unison for all turn-broaching tool units of the gang tool. In addition, the low stability of the workpieces often does not permit all of the cutters to be simultaneously in use on all points to be machined. Therefore, cutters corresponding to one another and having the same function must not be arranged on a turn-broaching tool unit in the same angular position. An angular position offset relative to one another is necessary so that only the desired number of cutters is always in use simultaneously on the workpiece. However, as a result, the available peripheral length of the turn-broaching tool units is often no longer adequate for the requisite number of individual, different cutters.

It is therefore the object of the invention to provide an apparatus as well as a machining method which combines high productivity with individual correction means for increasing process reliability by being able to retrofit existing machines with at least one additional turn-broaching tool unit per rest.

This object is achieved by a machine with the features of claim 1 with further advantageous features described in the subclaims.

By arranging at least two axially spaced turn-broaching tool units per rest, productivity is doubled as compared with individual turn-broaching tool units. In the case of a crankshaft having four main bearings, with a machine with only two rests, the same machining time can be achieved as with a gang tool.

If, in addition, the axial distance between the cutters of the one tool unit can be adjusted relative to the cutters of the other tool unit, preferably during the operation of the machine and automatically, groups of machining points with varying axial distances can be machined one after another. It is particularly advantageous for crankshafts having an uneven number of main bearing points, where the axial distances from the main bearing point number 1 to main bearing point number 2 and from main bearing point number 3 to main bearing point number 4 are different. Nevertheless, with tandem tool units, that is, two turn-broaching tool units on one rest, main bearings 1 plus 2 can be machined together in one operation and main bearings 3 plus 4 can be machined together in a subsequent operation.

Further, to reduce the downtime, the adjustment of the two turn-broaching tool units relative to one another in the axial Z-direction is preferably made by means of suitable, automatically controllable actuators, etc., and not by the manual adjustments of screws or other elements. Moreover, the axial distance between the cutters of the turn-broaching tool units of a rest can be changed to compensate for wear at the axially acting cutters of the turn-broaching tool units. Such change in the axial distance between the cutters of the various turn-broaching tool units of a rest can be preferably effected by changing the relative distance between the entire respective turn-broaching tool units in the Z-direction.

For this purpose, it is sufficient to axially fix one of the turn-broaching tool units to the tool-mounting shank carrying it while the other turn-broaching tool units of a rest are fastened in an axially adjustable manner either to the tool-mounting shank or directly to the axially fixed turn-broaching tool unit. The adjustments can be done manually by means of screws, spacer discs or similar elements. However, motor-driven adjustments by means of mechanical, hydraulic or pneumatic actuators is preferred.

While infinitely variable adjusting means to compensate for wear of the cutters is necessary, adjustments in certain axial distances which can be established beforehand, between two turn-broaching tool units (e.g. the two end positions of an existing adjusting range), can be made by the use of a simple pneumatic approach. For example, such a simple approach is sufficient when only the locations at different axial distances apart are to be machined as in the so-called chaotic workpiece sequence.

The compensation for wear at radially acting cutters is to be effected differently. As a rule these cutters extend over the entire periphery or at least a large part of the periphery of a turn-broaching tool unit. Although, the radial adjustability of the individual cutters, or of the cutter cassettes carrying the cutters, with respect to the pivotal axis of the respective turn-broaching tool unit is theoretically possible during the operation of the machine, considerable outlay in terms of construction and control is required because of the large number of cutters involved.

It is, therefore, preferable for the cutters on the various turn-broaching tool units of a rest to be distributed over the periphery with regard to their rotary angular position in such a way that only one cutter and only one turn-broaching tool unit per rest engages the workpiece. The cutters of the remaining turn-broaching tool units on the same rest, which are leading or trailing with respect to the rotary angle, are no longer or are not yet in contact with the workpiece respectively.

To achieve this result, the required angular distances between the individual cutters depend on the effective diameter of the turn-broaching tool unit as well as the diameter of the workpiece to be machined. When this angular distance is determined in each case for an individual cutter to be in engagement, the entire rest can be made to traverse in the X-direction by a correction value to compensate for wear of the cutter in the radial direction. Similarly, an axial correction can also be carried out separately (in the Z-direction) for each individual cutter either by traversing the rest or only of the corresponding turn-broaching tool unit, movable with respect to the rest. In the latter case, however, the axial correction by means of the axial adjustment of the entire turn-broaching tool unit is to be preferred, since the possibility of the simultaneous engagement of a plurality of cutters and thus of a plurality of turn-broaching tool units of the same rest is thereby retained.

In addition, the above described condition for the engagement of only one cutter per rest need not be maintained for all cutters or cutter groups.

For example, for roughing cutters, where the machining result sometimes does not need to be as accurate as that of the finishing cutters, it is sufficient to allow both or all turn-broaching tool units of a rest to engage simultaneously on the workpiece, so that the greatest possible stock is removable per unit time.

In contrast thereto, the finishing cutters of the same rest should be offsettingly arranged relative to one another in their angular position in order to permit the correction of the individual cutter in use.

In order to be able quickly to carry out the correction of the tool rest or of one or more turn-broaching tool units in the X- and/or Z-direction, which correction may be necessary to carry out again during each cutter change in an extreme case, these adjustments should be carried out in a motor-driven manner and the determination and presetting of the correction value should be carried out automatically.

For this purpose—in particular for the finishing cutters—automatic measuring of the individual cutters in the clamped state, i.e. in the machine tool, in the respective direction of action of the cutters (axially or radially) is to be provided. Here, the cutter is measured in its position relative to the rest by means of a measuring probe or other suitable measuring devices. An established deviation relative to the desired value is converted by the machine control into a corresponding correction value by which the rest, or the corresponding turn-broaching tool unit which carries the disc, is made to traverse when the corresponding cutter comes into use.

On the other hand, the roughing cutters, which sometimes can be set less accurately, can still be adjusted and fastened outside the machine on the turn-broaching tool unit in order to keep the downtime as short as possible.

For the same reasons, provision is preferably also made for the known wear of each cutter at each instant to be stored either at the machine in the machine control or on a mobile data carrier allocated to the respective tool. Consequently, when a turn-broaching tool unit is removed before the end of its serviceable life and re-installed for subsequent re-use, the instantaneous wear states of all of the cutters of this turn-broaching tool unit are already available so that it is not necessary to measure the wear of all cutters again for re-use.

One way of carrying out radial corrections individually for each turn-broaching tool unit, and in turn for each individual cutter, at one rest, and at the same time permitting the simultaneous engagement of a plurality of turn-broaching tool units of a rest on a workpiece to increase productivity, consists in making a radial adjustment to one turn-broaching tool unit relative to the shank or the turn-broaching tool unit carrying it by means of an eccentric or double eccentric.

Here, not only the amount but also the angular position of the eccentricity can be set by rotating the eccentric or the two parts of the double eccentric. In this manner even two identical cutters of adjacent turn-broaching tool units, arranged at the same angular position, can be in engagement on a workpiece simultaneously yet provided with different correction values. It is to be noted that the angular position of the individual cutters remains unaffected by this.

Where there are two turn-broaching tool units on one rest, one of the tool units is fixed in position and not adjustable radially relative to the shank carrying it, whereas the other tool unit is adjustable. The correction operation for the radially non-adjustable turn-broaching tool unit is effected by traversing the entire rest, and the correction operation for the radially adjustable turn-broaching tool unit is effected by adjusting the eccentric.

Figure 1A:
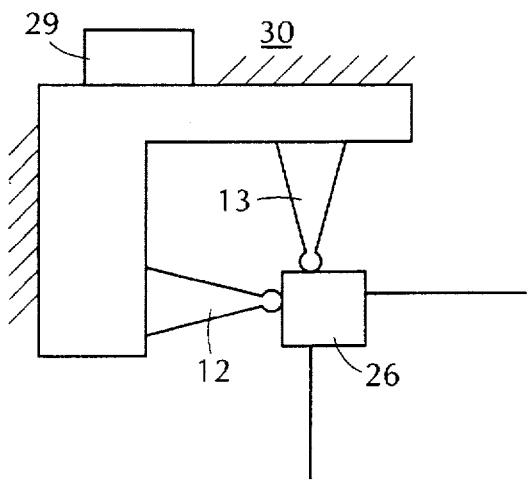
Figure 2:
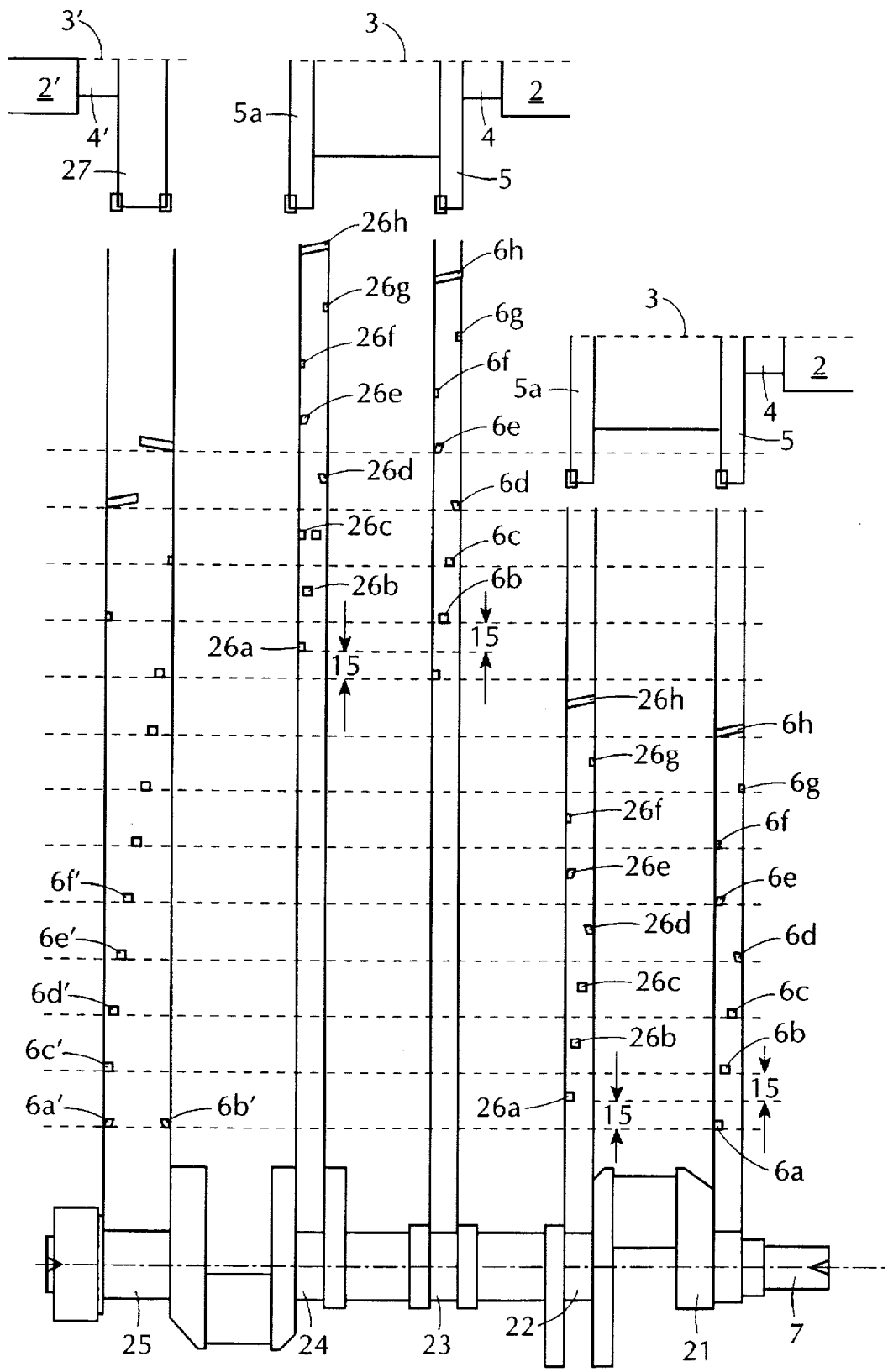
Figure 3:
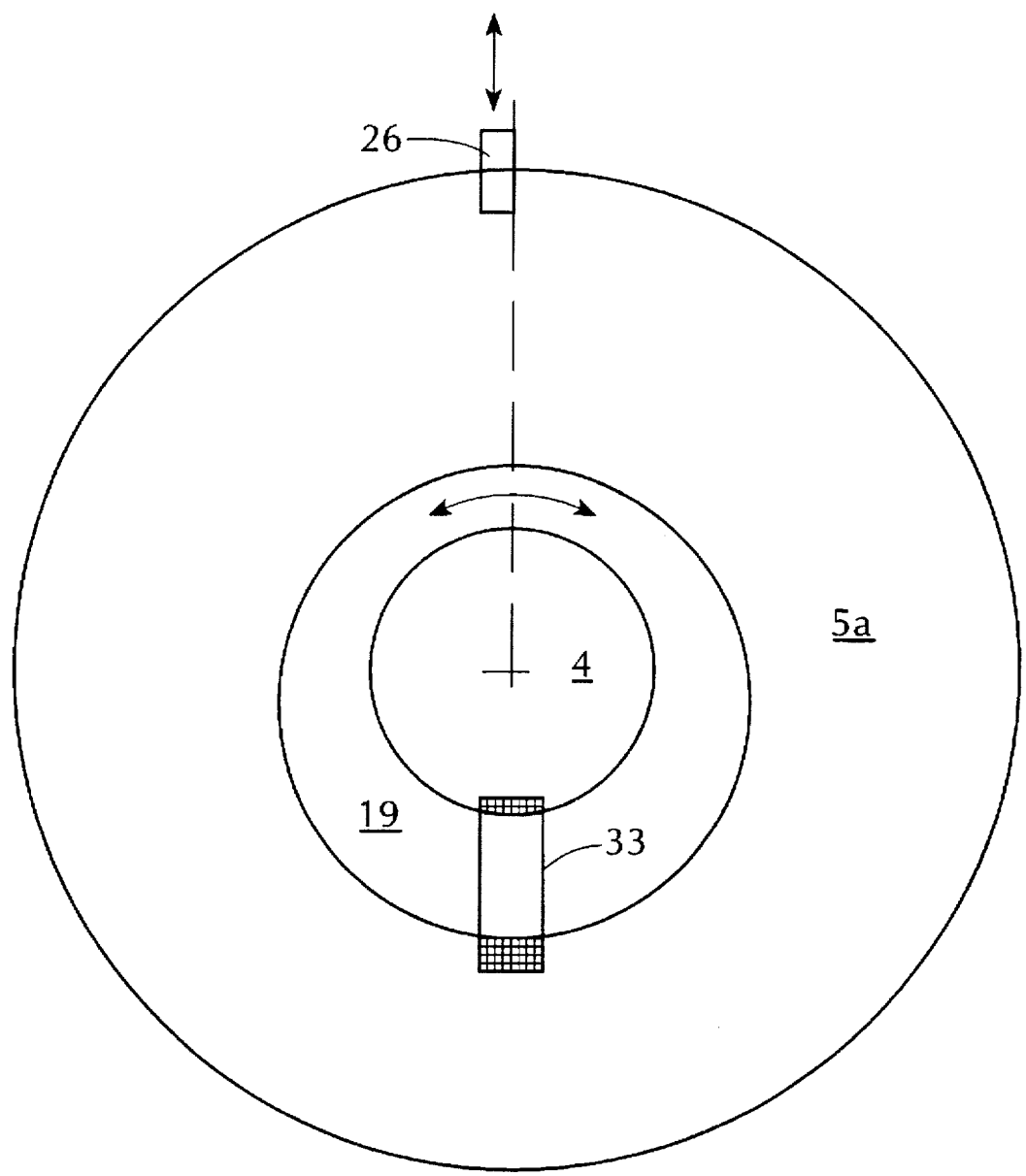

Instead of an eccentric or double eccentric, other design solutions which lead to the same result are also possible. Exemplary embodiments according to the invention are described below with reference to the figures, in which:

FIG. 1 shows a basic representation of the machine tool according to the invention, FIG. 1A shows a measuring device for the position of the cutters, FIG. 2 shows the cutter arrangement of two rests in another embodiment, and FIG. 3 shows a sectional representation of a turn-broaching tool unit having radial adjustment relative to the tool-mounting shank.

FIG. 1 shows in planar view a basic representation of a machine tool according to the invention. Here, the crankshaft 7, of which the main bearing points 21 to 25 are to be machined, is clamped and driven at high rotational speed between tailstock 31 and headstock 32.

Furthermore, two rests 2, 2' are each traversably arranged independently of one another in the X- and Z-direction on bed 30 (not explicitly shown) of machine tool 1. Each rest carries two axially spaced, roughly disc-shaped turn-broaching tool units 5, 5a in a freely projecting manner. In order to create the necessary axial distance between rest 2, 2' and the turn-broaching tool units 5, 5a and 5', 5a' respectively, the rest and tool units are connected to one another via a tool-mounting shank 4, 4'.

In the crankshaft shown in FIG. 1, having five main bearing points, machining may be effected, depending on stability, simultaneously or in succession on one portion at main bearing points 21 and 22 by means of rest 2 and on another portion at main bearing points 24 and 25 by means of rest 2'. The main bearing point 23 may then be machined by means of one of the rests 2, 2'.

Possible collisions with the workpiece are to be taken into consideration. For example, where the main bearing point 21 is at a distance from the main bearing point 22 which is different from its distance to the opposite main bearing point 23, or other crankshafts having different distances between the bearing points to be machined are also to be machinable, the axial distances 10 or 10' is variable between the cutters 6 and 26 of the tool units 5, 5a and 5', 5a' of the same rest.

At rest 2 shown in the right-hand half of the FIG. 1 the disc-shaped unit 5 is, for this purpose, fixed axially on shank 4, and is driven in a pivoting manner or in a slowly rotating manner about pivot axis 3. The second unit 5a is not connected to shank 4 but to the first unit 5 and can be adjusted in its axial distance at least manually by turning adjusting screws 28.

At the extreme projected length of unit 5a relative to the rest 2, the free end face, remote from the rest, of unit 5a can be further supported by means of bridge 18 strongly fastened to another part of the rest remote from the workpiece and is constructed so as to be axially variable in length in the Z-direction.

In contrast, at the left-hand rest 2', both the turn-broaching tool unit 5' nearest the rest 2' and the more remote unit 5a' are fastened to the preferably continuous tool-mounting shank 4'. To change the distance in the axial direction between the two units 5' and 5a', shank 4' is constructed in such a way as to be variable in length. The change in distance is preferably by means of an actuator 20 arranged centrally on the pivot axis 3' which can be motor-driven and automatically activated, with the instantaneous correction values delivered by a control unit allocated to the machine tool.

Each individual unit 5', 5a' could likewise be provided with an appropriately long, variable in length, tool-mounting shank 4, which is then put onto the free end face of the last projecting turn-broaching tool unit 5', 5a'.

It is important that additional tool units 5a, 5a' can be fastened very quickly, preferably by means of a single, central quick-lock mechanism 17, to keep the set-up time as short as possible.

As shown in the swung-out partial representation in FIG. 1 (direction of view: Z) of the turn-broaching tool unit 5a', the tool units carry in their peripheral area individual cutters 26a', 26b' ... 26z' which are adjusted and fastened on the unit directly or by means of cutter cassette 16. Here, depending on the requisite number of individual cutters, it is not necessary for the entire periphery of a turn-broaching tool unit 5', 5a', 5a, 5 to be set with cutters.

The allocation of the individual cutters on the various tool units and the various rests is shown in more detail in FIG. 2.

The detail enlargement in FIG. 1 reveals a measuring device for the position of the cutters, 6, 26, etc. The measuring device is, as a rule, fastened to bed 30 of machine tool 1 in a fixed position or in such a way that it can be swung into a measuring position. It measures the surfaces of the cutters of the tool unit located on rest 2, by scanning the corresponding cutting edges of the cutter 26 by an axial measuring device 12 and/or a radial measuring device 13. The measuring devices 12, 13 are arranged in a fixed position on the bed of the machine tool, and cutter 26 is moved by traversing rest 2 in the X- and/or Z-direction until cutter 26 makes contact with the measuring devices 12, 13 (during which a defined rotary position of cutter 26 relative to the pivot axis 3 must, of course, be maintained).

Upon contact, the positional coordinates of rest 2 are determined, from which the positions of the cutting edges of cutter 26 relative to the rest and, thus, also absolutely relative to the bed of machine tool 1 is obtained. Conversely, it is also possible to traverse rest 2 and cutter 26 into a defined measuring position, for example the zero position, and to design the measuring devices 12, 13 in such a way as to be traversable in the appropriate directions relative to bed 30. In this way, the actual value of the cutting edges of cutter 26 in the X- and Z-direction relative to the rest 2 can be determined very accurately.

The correction values for each cutter are determined by a control unit 29 by comparing the measured values with the corresponding desired values. If the axial cutting edge of a cutter 26, of turn-broaching tool unit 5 axially fixed relative to rest 2 is worn, and if a correction of its position has to be carried out in the Z-direction, it can be done by traversing rest 2 in the Z-direction.

If a further correction of a cutter 26 of turn-broaching tool unit 5a of the same rest is necessary in the axial direction, this unit 5a is displaced in the Z-direction relative to unit 5 via adjusting screws 28 until the desired axial distance 10 or 10' is restored.

However, the axial corrections to be carried out at the various tool units 5, 5a of a rest 2 are not necessarily equal for all cutters at the periphery. In order to be able to carry out these corrections separately for each of the cutters 6a, 6b, 6c or 26a, etc., without adversely affecting the machining process, the cutters 6a and 26a, 6b and 26b, etc., corresponding to one another, of the various turn-broaching tool units 5, 5a of a rest 2 are not arranged in the same angular position. This is better shown in FIG. 2.

As can be recognized in the upper part of the embodiment of FIG. 2, an angular distance 15 is maintained between all cutters 6a, 26a, 6b, 26b, etc., which angular distance 15 is so large that in each case at most only one cutter of a rest 2 can be instantaneously in engagement on crankshaft 7.

During the slow rotation of the tool units about the pivot axes 3, 3' during turning/turn broaching, the appropriate correction movement in the X- and/or Z-directions can be effected between the disengaging of one cutter and the engaging of the next cutter, without stopping the pivoting movement as a rule, by means of rest 2 or the corresponding axially movable turn-broaching tool unit 5a.

Furthermore, from FIG. 2 it can be recognized that the main bearing points 21 and 22 are machined in one operation by means of rest 2 first, and then the main bearing points 23 and 24 are machined by means of the same rest 2 in another single operation.

During this entire time, the clearly wider main bearing point 25 is machined by means of rest 2', with only a single turn-broaching tool unit 5', since a larger number of cutters and a longer machining time is necessary for this bearing point with cutters of the same width.

The above described measuring of the surface positions of the cutters by means of measuring device 12 or 13 is preferably advisable for the finishing cutters used during the fine-machining operations. Whereas, the positions of the roughening cutters need only be accurate to a tenth of a millimeter. Thus, wear of the roughening cutter surfaces need not be compensated for by correction methods. This means that the repeated measuring process need not be made for the roughing cutters and the downtime of the machine tool is reduced. The roughing cutters can be adjusted and fastened on the turn-broaching tool units 5, 5a, 5', 5a' without being mounted on machine tool 1 at a separate tool setting-up place.

Radial correction of the cutters 6, 26 is also desirable mainly for reasons of tool wear. However, means for the radial adjustment of each individual cutter relative to the tool units 5, 5a, 5', 5a' carrying it requires too high a cost of construction. Two different methods for accomplishing this type of adjustment are provided herebelow:

In one way, the angular distance 15 between the individual cutters of a rest 2, 2' is maintained to ensure that only a single cutter per rest is engaged. In this manner, the correction movement for each cutter can be made in turn in the X-direction by traversing rest 2, 2' before the engagement of the next respective cutter.

Alternatively, the cutters of two or even more tool units 5, 5a, etc. of one and the same rest 2 are to be in engagement simultaneously. That is, cutters 6a, 26a corresponding to one another are to be arranged without an angular distance 15 on the same generating line and thus are in the same angular position. As shown in FIG. 3 with a view in the Z-direction, a radial adjustment of a cutter 26 can also be made in this latter case by the radial adjustment of the entire disc 5a carrying it with respect to the pivot axis 3 of rest 2. For this purpose, the annular or disc-shaped turn-broaching tool unit 5a is not mounted directly on the concentric tool-mounting shank 4 (or the axially offset further unit 5) but by means of an eccentric 19 arranged concentrically in between. By a suitable antirotation lock 33 between the tool unit 5a and the shank 4, a relative rotation between these two components is impossible so that the cutter 26 to be adjusted radially always remains in the same angular position with respect to the tool-mounting shank 4. By rotation of the eccentric 19 through a maximum of 180°, however, a radial adjustment of the entire turn-broaching tool unit 5a relative to the shank 4 and thus also relative to the adjacent turn-broaching tool units of the same rest is thereby possible within specified limits.

We claim:

1. A machine for rotary broaching, turning/turn broaching or turning, comprising a bed, at least two tool rests mounted to the bed, said tool rests having a Z-axis and being traversable horizontally relative to the bed along the Z-axis and perpendicularly to the Z-axis in an X-direction, the tool rests having at least one tool mounting in the Z-direction and pivotable or rotatable about the Z-axis, the tool mounting comprising a tool-mounting shank having a free end and carrying, in the Z-direction, at least two axially spaced turn-broaching tool units having a plurality of peripheral cutters, said tool rests being movable independently of each other at least in the X-direction perpendicular to the Z-axis.

2. A machine according to claim 1, characterized in that the axial distance between the cutters of the turn-broaching tool units mounted on the same tool rest is adjustable relative to each other and that the axial distance between the cutters is adjustable as a function of the rotary position of the turn-broaching tool units during the operation of the machine.

3. A machine according to claim 1, characterized in that the radial distance of the cutters from the pivotal axis of the respective turn-broaching tool units is adjustable.

4. A machine according to claim 2, characterized in that the axial distance between the turn-broaching tool units is adjustable by changing the position of at least one of the turn-broaching tool units in the Z-direction relative to the tool-mounting shank.

5. A machine according to claim 2, characterized in that one of the turn-broaching tool units is fixedly connected to the tool-mounting shank in the Z-direction, and at least one further turn-broaching tool unit is adjustably coupled in the Z-direction to the turn-broaching tool unit fixed in the Z-direction.

6. A machine according to claim 2, characterized in that it further comprises an automatic measuring device for measuring the position of the cutters with respect to the rest or the bed of the machine, and a control unit for calculating a correction value, established in the turn broaching process as a difference between a desired position and the actual position of each cutter surface, and automatically adjusting the axial distance between the cutters and moving the corresponding rest as necessary.

7. A machine according to claim 3, characterized in that it further comprises an automatic measuring device for measuring the position of the cutters with respect to the rest or the bed of the machine, and a control unit for calculating a correction value, established in the turn broaching process as a difference between a desired position and the actual position of each cutter surface, and automatically adjusting the axial distance between the cutters and moving the corresponding rest as necessary.

8. A machine according to claim 6, characterized in that the cutters of each of the turn-broaching tool units of the same rest are offsettingly arranged relative to one another in their angular position with respect to the pivotal axis such that, upon engagement of one of the cutters of one of the turn-broaching tool units, the cutters of the other turn-broaching tool unit of the same rest which are adjacent, with respect to the angular position, are not in contact with the machining point.

9. A machine according to claim 7, characterized in that the cutters of each of the turn-broaching tool units of the same rest are offsettingly arranged relative to one another in their angular position with respect to the pivotal axis such that, upon engagement of one of the cutters of one of the turn-broaching tool units, the cutters of the other turn-broaching tool unit of the same rest which are adjacent, with respect to the angular position, are not in contact with the machining point.

10. A machine according to claim 6, characterized in further comprising a storage unit, allocated to the machine or the turn-broaching tool unit, which permanently stores the last measured and calculated axial and radial correction values for each individual cutter.

11. A machine according to claim 7, characterized in further comprising a storage unit, allocated to the machine or the turn-broaching tool unit, which permanently stores the last measured and calculated axial and radial correction values for each individual cutter.

12. A machine according to claim 1, characterized in that the radial distance between the cutters of the first turn-broaching tool unit and the cutters of the second turn-broaching tool unit is adjustable as a function of the rotary position of the turn-broaching tool units during the operation of the machine.

* * * * *